Patented Oct. 28, 1924.

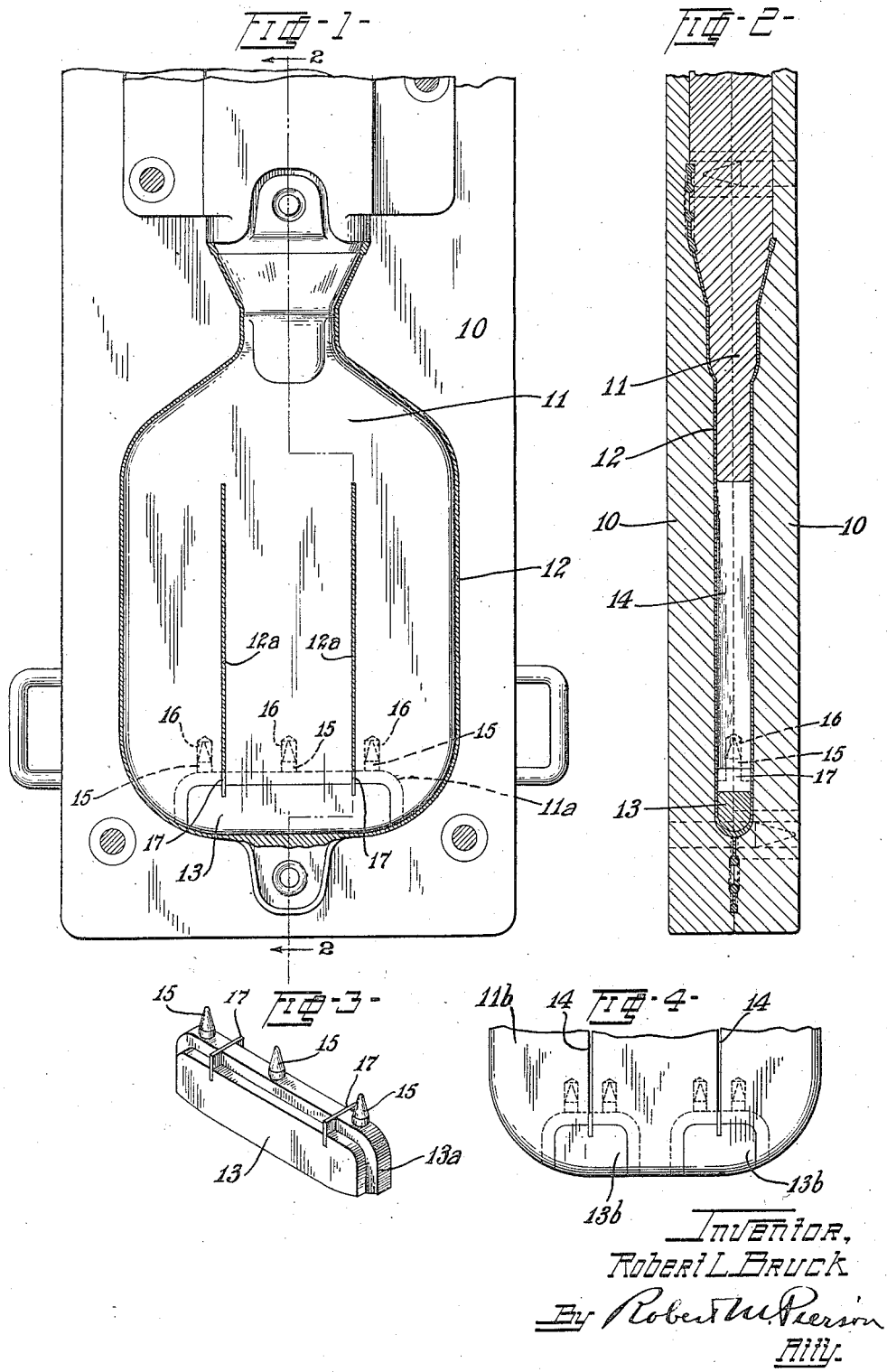

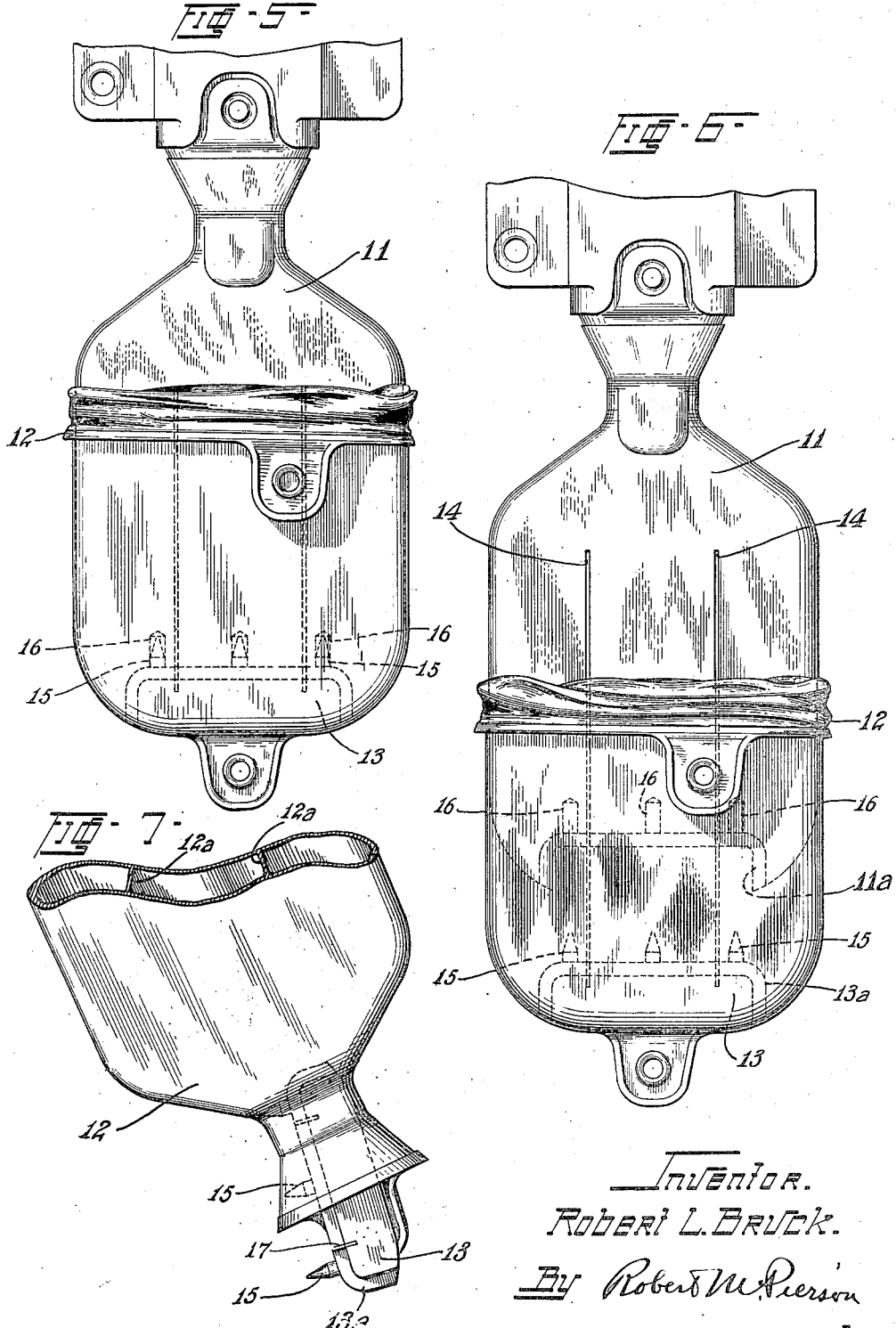

1,513,086

UNITED STATES PATENT OFFICE.

ROBERT L. BRUCK, OF CUYAHOGA FALLS, OHIO, ASSIGNOR TO THE B. F. GOODRICH COMPANY, OF NEW YORK, N. Y., A CORPORATION OF NEW YORK.

APPARATUS FOR MAKING HOLLOW ARTICLES.

Application filed March 20, 1924. Serial No. 700,520.

*To all whom it may concern:*

Be it known that I, ROBERT L. BRUCK, a citizen of the United States, residing at Cuyahoga Falls, in the county of Summit and State of Ohio, have invented a certain new and useful Apparatus for Making Hollow Articles, of which the following is a specification.

This invention relates to apparatus for making hollow articles, more particularly articles which have internal partition walls terminating short of their extremities, which require the forming mandrel to be separable so as to permit its removal from the article in separate parts.

The chief object of my invention is to provide a mandrel of two or more separable parts, which in assembled relation presents a rigid structure capable of resisting molding pressure, yet may be readily disassembled within an article such as a hot water bottle formed with cross-tying partitions, and removed in pieces.

A more specific object is to provide a sectional mandrel adapted to mold the interior of a rubber water bottle or the like having internal cross-tying members connecting its walls, and adapted to be removed in sections through the mouth of the bottle.

Of the accompanying drawings:

Fig. 1 is a plan view of an open mold section with my improved mandrel in operative position therein, in its preferred form, and the work therein in section.

Fig. 2 is a section on the line 2—2 of Fig. 1.

Fig. 3 is a perspective view of a separable portion of my improved mandrel.

Fig. 4 is a fragmentary elevation of a modified form of mandrel having more than one separable portion.

Fig. 5 is a side elevation of my improved mandrel with the work thereon, the latter being in the primary stage of removal.

Fig. 6 is a view similar to Fig. 5 at a succeeding stage of removal.

Fig. 7 is a view of the work after removal from the main section of the mandrel, showing the manner of removing the separable part therefrom.

Referring to the drawings, 10, 10 are the complemental halves of an ordinary water-bottle mold, and 11 is a mandrel cooperating therewith to form a water bottle 12, the latter being of rubber and adapted to be vulcanized in said mold in the usual manner.

The mandrel 11 is formed with a generally rectangular, separable portion 13 inset into its structure at its bottom edge, said separable portion being formed with a tongue 13$^a$ adapted to fit into a complemental groove 11$^a$ in said mandrel to prevent relative transverse movement of said member, and accurately to register one with the other.

The particular embodiment of my mandrel 11 here shown is formed with two parallel, through slots 14, 14, adapted to mold a pair of longitudinally disposed internal walls or partitions 12$^a$, 12$^a$ in the water bottle 12, said slots extending downward from the upper portion of said mandrel and opening into the recess normally occupied by the separable portion 13. The separable portion 13 is provided at its upper edge with a plurality of dowels 15, 15 adapted to occupy complemental recesses 16, 16 formed in the mandrel 11 at each side of the slots 14 therein, to prevent the mandrel from deforming and so changing the width of said slots when under molding pressure. A pair of transversely disposed plates 17, 17 in the upper edge of the separable portion 13, flush with the top of the tongue 13$^a$, are adapted to fit within the lower ends of the respective slots 14 to form straight bottom edges on the partitions 12$^a$.

In the modification shown in Fig. 4, the slots 14 in the modified mandrel, here designated 11$^b$, are closed at their lower ends by respective separable members 13$^b$, 13$^b$, which are the same general character as the member 13, except that each is adapted to bridge only one of the slots.

Although I have shown a water bottle with two internal walls or partitions, I do not wish to be limited to this number.

The method of manufacturing water bottles of the character described is substantially the same as with ordinary water bottles except that additional unvulcanized rubber is placed over the respective slots 14 of the mandrel to form the partitions 12$^a$ of the bottle.

To remove the bottle from the mandrel after vulcanization, the neck of the bottle is stretched sufficiently to permit it to be drawn inside out onto the widest part of the mandrel, see Fig. 5, and then the bottle is slid lengthwise of the mandrel without further reversal, the separable portion 13 being detached from the mandrel and remaining within the bottle, as shown in Fig. 6. Said separable portion is then manipulated within the bottle until it is entirely within one of the compartments therein, and is then removed through the neck of the bottle by inverting the latter, as clearly shown in Fig. 7.

The substantially rectangular form of the separable mandrel section 13 or 13$^b$ permits it to bridge the slot or slots in the main section of the mandrel, and yet to be of such short length as to make it readily removable from the bottle, and also, when such section is provided with the interfitting tongue 13$^a$ on three of its sides, it is adapted very strongly to resist angular displacement with relation to the main mandrel section.

My invention is susceptible of other modifications within its scope and I do not limit my claims wholly to the specific construction shown.

I claim:

1. Apparatus for making a hollow article having a partition, said apparatus comprising a mold and a sectional mandrel therefor, one section of said mandrel being formed with a slot for molding said partition, and the other section forming a closure for one end of said slot.

2. Apparatus for making a hollow article having an internal partition, said apparatus comprising a mold and a sectional mandrel therefor, one section of said mandrel being formed with a slot for molding said partition, and another section of said mandrel interfitting with the first to close the end of said slot and being of such dimensions as to be removable from the article by passage through the space at one side of said partition.

3. Apparatus for making a hollow article having an internal partition, said apparatus comprising a mold, a mandrel formed with a slot for molding said partition, a separable section constituting a part of said mandrel, for closing one end of said slot, and means on said separable section engaging the main section of said mandrel at each side of said slot, and adapted to prevent variation in the width of said slot by molding pressure upon the mandrel.

4. Apparatus for making a hollow article having an internal partition, said apparatus comprising a mold, a mandrel formed with a slot for forming said partition, a separable section constituting a part of said mandrel and inset into the main section thereof for closing one end of said slot, and dowel pins on said separable section engaging said main mandrel section at each side of said slot to prevent variation of the width of the latter under molding pressure.

5. Apparatus for molding a hot water bottle having an integral cross-tying member connecting its side walls said apparatus comprising a mandrel section for internally molding the upper part of the bottle, adapted to be withdrawn through the neck thereof, and formed with a recess for molding said cross-tying member, and a second mandrel section fitting the first section to close said recess, said second section being withdrawable through the neck of the bottle.

6. Apparatus as defined in claim 5 in which the two mandrel sections are interlocked against relative movement except longitudinally of the bottle.

In witness whereof I have hereunto set my hand this 18th day of March, 1924.

ROBERT L. BRUCK.